United States Patent
Roos et al.

(10) Patent No.: US 11,179,725 B2
(45) Date of Patent: Nov. 23, 2021

(54) SEPTA

(71) Applicant: CYTIVA SWEDEN AB, Uppsala (SE)

(72) Inventors: Hakan Erik Roos, Uppsala (SE); Stefan Sjolander, Upsalla (SE); Per Kjellin, Upsalla (SE); Bharath Subrahmanya, Bangalore (IN)

(73) Assignee: CYTIVA SWEDEN AB, Uppsala (SE)

( * ) Notice: Subject to any disclaimer, the term of this patent is extended or adjusted under 35 U.S.C. 154(b) by 171 days.

(21) Appl. No.: 16/315,905

(22) PCT Filed: Jul. 6, 2017

(86) PCT No.: PCT/US2017/040933
§ 371 (c)(1),
(2) Date: Jan. 7, 2019

(87) PCT Pub. No.: WO2018/009689
PCT Pub. Date: Jan. 11, 2018

(65) Prior Publication Data
US 2019/0308189 A1 Oct. 10, 2019

(30) Foreign Application Priority Data

Jul. 7, 2016 (IN) .............................. 201611023320

(51) Int. Cl.
*B01L 3/00* (2006.01)
*G01N 35/10* (2006.01)
(Continued)

(52) U.S. Cl.
CPC ........ *B01L 3/50853* (2013.01); *B65D 51/002* (2013.01); *G01N 35/1004* (2013.01);
(Continued)

(58) Field of Classification Search
CPC ............. B01L 3/50853; B01L 3/50825; B01L 2300/048; B01L 2200/0684;
(Continued)

(56) References Cited

U.S. PATENT DOCUMENTS 4,632,673 A    12/1986  Tiitola et al.
5,611,792 A *   3/1997  Gustafsson ........... A61J 1/1406
                                                                215/247
(Continued)

FOREIGN PATENT DOCUMENTS

CN    1268895 A    10/2000
CN    1860069 A    11/2006
(Continued)

OTHER PUBLICATIONS

International Search Report and Written Opinion for corresponding PCT application No. PCT/US2017/040933 dated Dec. 11, 2017; 18 pages.

(Continued)

Primary Examiner — Samuel P Siefke
Assistant Examiner — Henry H Nguyen
(74) Attorney, Agent, or Firm — Jeff B. Vockrodt; Culhane Meadows, PLLC

(57) ABSTRACT

A self-adhesive layered septum is disclosed. In one example, the septum includes a first outer layer including a thermoplastic elastomer such as a styrenic block copolymer, containing styrene ethylene butylene styrene (TPE-SEBS) capable of closing at least partially an aperture formed when a needle is inserted through the layer; an adhesive second layer for adhering the septum to a mouth area of a well or container to which the septum is attachable; and a thermoplastic third layer between the first and second layers, thermobonded to the first layer and providing better adherence for the adhesive layer. The first layer includes a recess (Continued)

and a vent, which reduce pressure differentials in use, but together with the third layer minimize evaporation through the septum.

13 Claims, 3 Drawing Sheets

(51) Int. Cl.
*B65D 51/00* (2006.01)
*A61J 1/14* (2006.01)

(52) U.S. Cl.
CPC ......... *G01N 35/1079* (2013.01); *A61J 1/1406* (2013.01); *B01L 3/50825* (2013.01); *B01L 2200/0684* (2013.01); *B01L 2200/142* (2013.01); *B01L 2300/044* (2013.01); *B01L 2300/048* (2013.01); *B01L 2300/0887* (2013.01)

(58) Field of Classification Search
CPC ......... B01L 2200/142; B01L 2300/044; B01L 2300/0887; B65D 51/002; G01N 35/1004; G01N 35/1079; A61J 1/1406
See application file for complete search history.

(56) References Cited

U.S. PATENT DOCUMENTS

| | | | |
|---|---|---|---|
| 10,246,232 B2 | 4/2019 | Johnson et al. | |
| 2001/0041336 A1* | 11/2001 | Anderson | B01L 3/50825 435/6.11 |
| 2002/0083686 A1* | 7/2002 | Audino | B01L 3/50853 53/478 |
| 2002/0172621 A1* | 11/2002 | Barbera-Guillem | B01L 3/50853 422/503 |
| 2007/0065611 A1 | 3/2007 | Thilly et al. | |
| 2009/0057259 A1* | 3/2009 | Johnson | B65D 53/00 215/247 |
| 2009/0257922 A1 | 10/2009 | Baker | |
| 2011/0263461 A1 | 10/2011 | Kastury et al. | |
| 2013/0312546 A1 | 11/2013 | Wada | |

FOREIGN PATENT DOCUMENTS

| | | | | |
|---|---|---|---|---|
| CN | 101622028 A | 1/2010 | | |
| CN | 101790420 A | 7/2010 | | |
| CN | 201759855 U | 3/2011 | | |
| CN | 203450544 U | 2/2014 | | |
| CN | 105106014 A | 12/2015 | | |
| EP | 1302243 A1 | 4/2003 | | |
| JP | 2006284350 A | 10/2006 | | |
| JP | 2010099036 A | 5/2010 | | |
| WO | WO-9714967 A1 * | 4/1997 | ......... | G01N 35/1079 |
| WO | WO-0045180 A1 * | 8/2000 | ............. | C09J 7/381 |
| WO | 2012105171 A1 | 8/2012 | | |

OTHER PUBLICATIONS

Japanese Office Action received in Application No. 2018-567605 dated Feb. 1, 2021, with translation, 9 pages.
Chinese Office Action received in Application No. 201780041900.2 dated Dec. 24, 2020, 19 pages.
Office Action received in Chinese Application No. 201780041900.2 dated Jul. 15, 2021, with translation, 37 pages.

* cited by examiner

SEPTA

CROSS-REFERENCE TO RELATED APPLICATIONS

This application is a filing under 35 U.S.C. 371 of international application number PCT/US2017/040933, filed Jul. 6, 2017, which claims priority to IN application number 201611023320, filed Jul. 7, 2016, the entire disclosure of each of which is hereby incorporated by reference.

TECHNICAL FIELD

The present invention relates to septa of the type that cover analyte or reagent wells or containers and which allow access of a sampling tip such as a pipetting needle to the well or container. In particular, but not exclusively the invention relates to a septum which covers multiple wells of a so called multiwell microplate, but also known as a microtiter plate, having an array of reagent or analyte wells of generally small volume intended to be accessed by a similarly spaced array of pipetting needles.

BACKGROUND

The main function of a microplate cover is to inhibit evaporation from an analyte well and to protect the well from contamination, particularly where the well contents are stored for perhaps a day or a week. For practical purposes the cover should be fittable by a user after the desired materials are placed in the well, although inserting the materials into the well via a pipetting needle or the like after the cover is fitted is possible with the invention defined below. Such a function can be achieved conventionally using an elastomeric septum, although the durability of such septa, after several needle punctures, is poor, leading to increased evaporation.

It is known to provide a rubberized septum over the wells such that the septum will stretch and provide a seal around needle when the needle is inserted through the septum. When this happens, the act of withdrawing materials from or depositing materials into a well, for example liquids can cause a reduction or an increase in pressure in the well. In turn, this leads too little material take up in the needle, or insufficient material being deposited into the well. Whilst venting of the well is a possibility, this increases evaporation in the well which is disadvantageous.

The inventors have realized that a new design of septum is needed to address the twin problems of inhibiting evaporation and venting to mitigate pressure changes in the microplate wells. Embodiments of the invention address those problems.

Additional challenges arise when the cover is used in combination with a sampling needle for example of the type used in a so called autosampler where a plural needles are arranged in an array to coincide with the spacing of the array of wells of the microplate, and so that multiple samples can be collected from or deposited into the wells. Continual insertion of a needle into a septum, typically occurring when using such autosamplers, produces holes that do not close up, which increases evaporation.

Commercially available microplate covers are available that are resealable to allow an autosampler needle to reach the sample with low force but they have flaps/slits that move away by the needle. Testing of such covers shows significant evaporation because the flaps do not make a tight seal. Furthermore, the flaps/slits reduce the working volume in the well since they bend down into the well, which is undesirable due to the risk the flaps may contact the well contents. Some well plate covers are reusable and are formed as mats designed as 96 caps that are pressed down into the microplate wells. They reduce the working volume of the well significantly and the inherently compressed rubber requires high force to be penetrated. Conventional 96 well foils give low evaporation before first penetration but after penetration evaporation starts and these foils do not wipe liquid off the needle exterior thus so-called liquid carry-over (excess liquid on the exterior of the needle/pipette) is a problem.

The inventors have realized that certain materials can be used for a septum type cover which will: close up even after multiple penetrations, thereby reducing evaporation; and wipe the needle as it is withdrawn whilst keeping the insertion force low. Embodiments of the invention address this realization.

BRIEF DESCRIPTION

According to a first aspect of the invention there is provided a self-adhesive layered septum comprising: a first outer layer comprising or consisting of a resilient copolymer capable of closing at least partially an aperture formed when a needle is inserted through the layer; and an adhesive second layer for adhering the septum adjacent to a mouth area of a well or container to which the septum is attachable.

Preferably, the first layer extends substantially continuously over the mouth area save for a vent at the mouth area.

Preferably the second layer is partially or completely absent within the mouth area.

Preferably the septum includes a third layer between the first and second layers, said third layer comprising or consisting of a thermoplastic layer capable of thermobonding to the first layer, and capable of adhering to the second layer.

Preferably the third layer is an axially or biaxially oriented polypropylene film.

Preferably the third layer is continuous across the mouth area prior to any insertion of a needle through the septum.

Preferably the first layer includes a recess at the mouth area in a surface of that layer that faces the third and second layers, and preferably the vent is formed within the recess.

Preferably the first layer is formed from a thermoplastic elastomer (TPE) optionally a styrenic block copolymer, for example styrenic thermoplastic elastomer TPE-S, further optionally with styrene ethylene butylene styrene (SEBS).

Preferably the first and third layers are bonded together for example using heat and pressure in combination.

According to a second aspect of the invention, there is provided a multiwell microplate comprising a spaced array of wells, at least one, preferably all said wells being covered by a self adhesive layered septum according to the first aspect.

According to a further aspect of the invention, there is provided, an SPR instrument or high resolution microscope including automated sample handling including at least one multiwell plate according to the second aspect.

According to a further aspect of the invention, there is provided, a method for inhibiting evaporation in one or more reagent or analyte wells, the method comprising covering the or each well with a septum according to the first aspect, and adhering said septum around the mouth of the or each well.

Embodiments of the invention provide a self-adhesive septum, which eliminates or reduces evaporation, whilst venting the well during sample extraction or sample depositing. More advantages and benefits of the present invention will become readily apparent to the person skilled in the art in view of the detailed description below.

BRIEF DESCRIPTION OF THE DRAWINGS

The invention will now be described in more detail with reference to the appended drawings, wherein.

DETAILED DESCRIPTION

Figure 1:
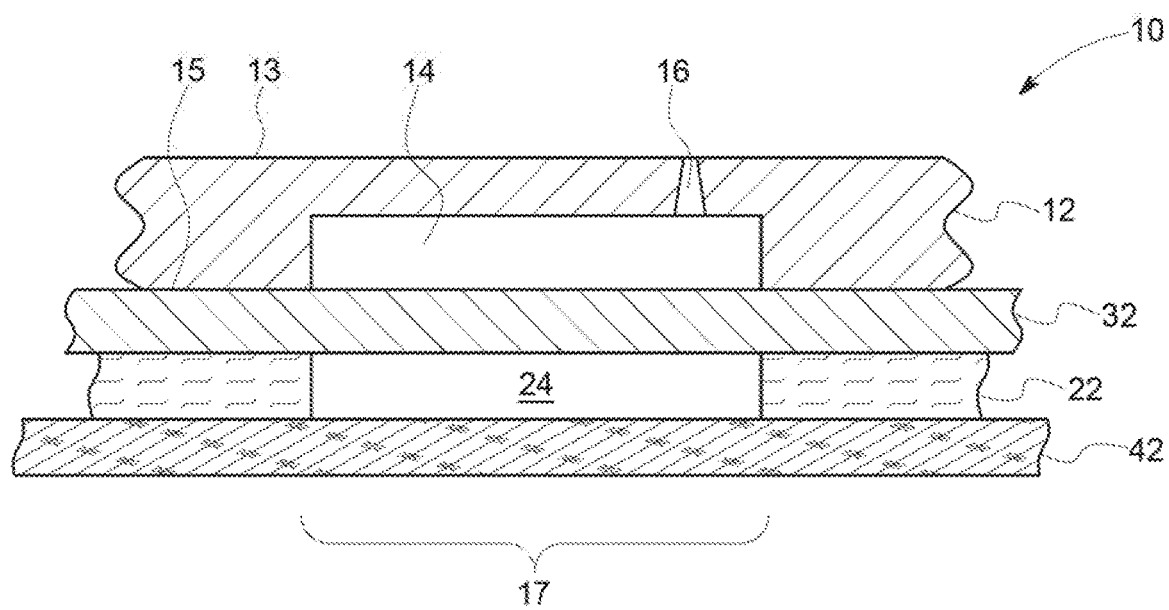
FIG. 1 shows a sectional enlarged view of a first embodiment of a septum according to the invention.

FIG. 1 shows a sectional view of a septum 10 according to the invention which has plural layers defined below. The septum 10 is intended to be adhered over a well 7 as shown in FIG. 2, allowing a needle 9 or other pipetting device to pierce the septum.

The septum 10 is formed from a first layer 12 formed from a resilient injection moulded copolymer in this case a block copolymer in the form of thermoplastic elastomer (TPE), of the styrenic family, for example styrenic thermoplastic elastomer TPE-S, with styrene ethylene butylene styrene (SEBS) available from Elasto Hexpol TPE under the trade name Dryflex. The TPE-SEBS layer 12 has an outwardly facing surface 13, an inwardly facing surface 15, a recess 14 in the inwardly facing surface 15 and a vent aperture 16 forming a fluid communication between the recess 14 and the outwardly facing surface 13. The septum 10 further comprises a second layer 22 formed from a commercially available pressure sensitive low surface energy acrylic adhesive film, in this case a double sided adhesive film with a manufacturers code of 93015LE supplied by 3M and formed from a polyester carrier and each side of the carrier having said adhesive e.g. 300LSE adhesive sold by 3M, and a third intermediate layer 32 form from a continuous film of polymer material for example an oriented, i,e machine stretched axially or bi-axially, polypropylene (PP). The PP layer 32, with or without the adhesive layer, is thermo-bonded to the TPE layer 12, i.e. the face 15 is brought into contact with the corresponding surface of the PP layer 32 and compressed with a force of about 5 Bar for about 5 seconds at a temperature of about 140 degrees Celsius, and allowed to cool for a further period of time whilst maintaining the same pressure. The adhesive layer 22 has attached thereto a peel-off protective film 42 which is removed immediately before use to preserve the adhesive prior to use. It will be noted that the area 24 which is intended to be placed over the mouth area 17 of a well 7 is free or substantially free from adhesive, and the recess 14 coincides with the mouth area 24. This adhesive free area is formed by cutting a disk of the adhesive layer (i.e. the double sided film) out of said film.

Figure 2:
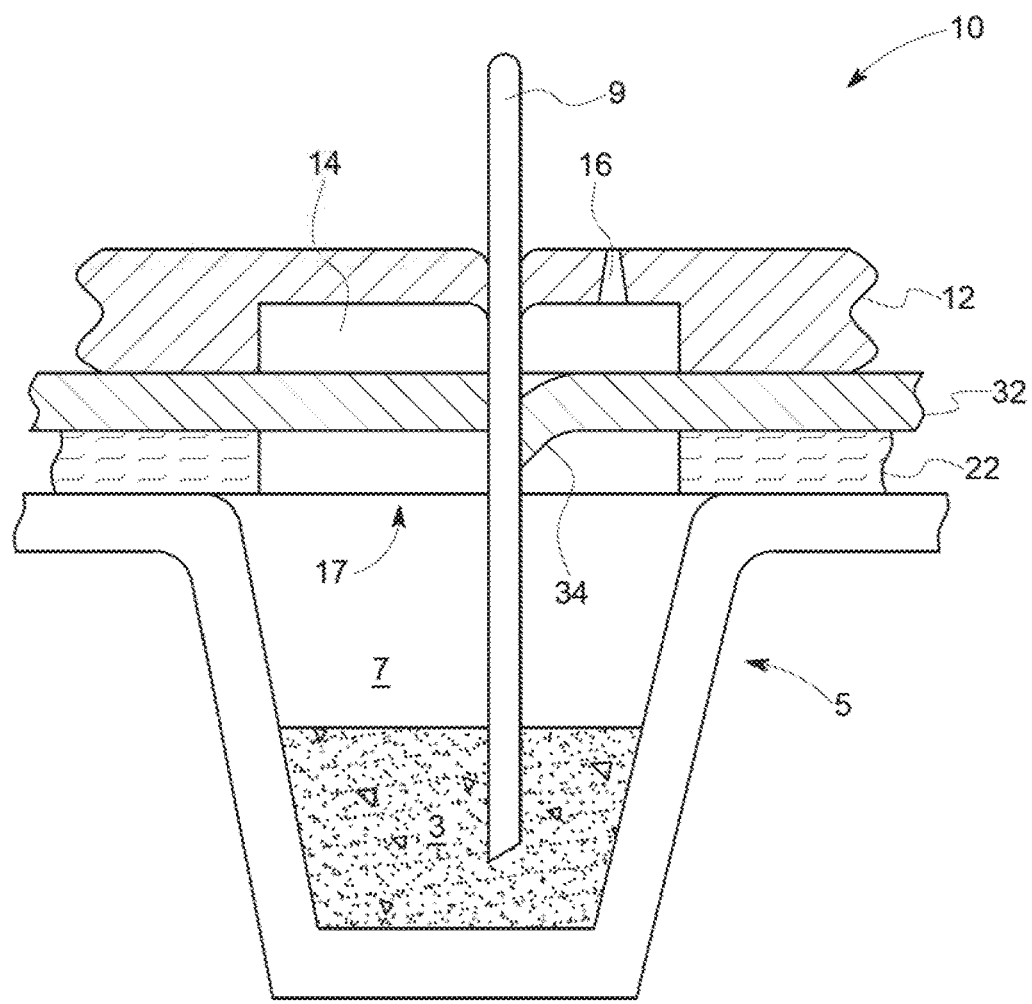
FIG. 2 shows the septum illustrated in FIG. 1 in use.

FIG. 2 shows a sectional view of the septum 10 in use, covering a well 7 in a microplate 5. Whilst the Figure depicts the septum 10 pierced by a pipetting type hollow needle 9 which extends into an analyte 3 contained in the well 7, it will be readily apparent that prior to said piercing, the septum 10 will cover the well mouth 17 and seal the same against evaporation, but virtue of the adhesive seal provided by the adhesive layer 22, and by means of the continuous PP polymer layer 32 closing the mouth 17 of the well 7.

Still referring to FIG. 2, the descending needle 9 will pierce the TPE layer 12, and by virtue of the resilient nature of the TPE material, and will force that material aside, rather than tear or cut the material, to form a seal around the needle. The needle will then cut through the PP layer 32, to form a flap 34 or a split of PP material, which does seal around the needle, but rather, allows fluid communication between the well 7 and the recess 14, and, via the vent 16 to the outside of the well 7. Extraction or depositing of fluid materials to or from the needle which acts as a pipette can then take place without problems associated with pressure differentials. Additionally, there is no adhesive layer 22 at area 24, which has the advantage that no adhesive contamination of the needle occurs.

Figure 3:
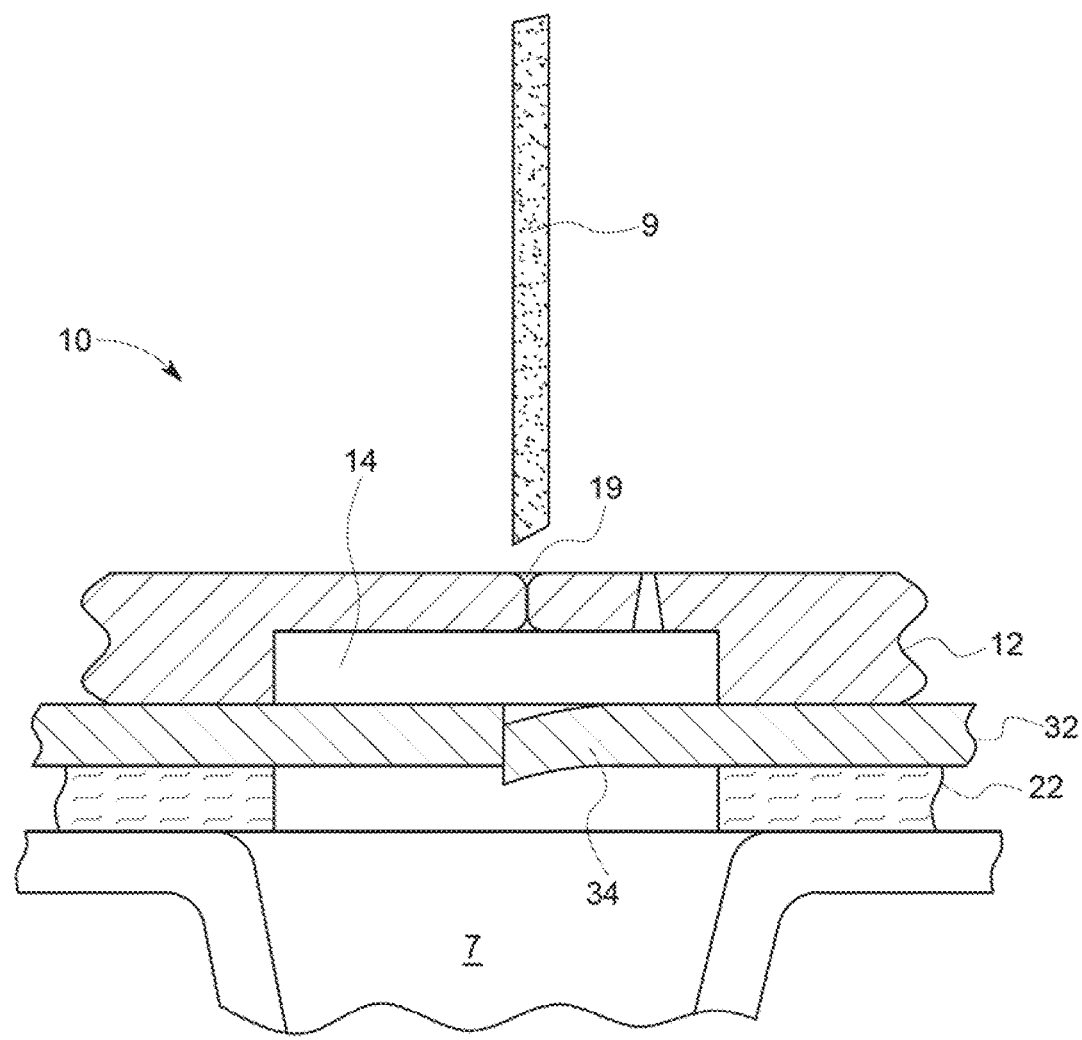
FIG. 3 shows the septum illustrated in FIG. 1 after use.

FIG. 3 shows a sectional view of the septum 10 once the needle 9 is removed. In this figure, the TPE layer 12 has a piercing 19 which has closed or substantially closed as a result of the resilience of the TPE material. This resilience also acts to wipe clean the needle as it is removed, which for high resolution instruments supplied by the needle, is a significant advantage because excess fluid around the outside of the needle is removed or substantially removed. The flap 34 of the PP film has to some extent returned to its uncut position, but does not form a complete seal of the well 7. Nevertheless, the limited fluid communication resulting from that closed or semi closed flap 34, and dead space formed by the recess 14 inhibit substantially evaporation of liquids in the well 7, such that evaporation is not problematic.

Figure 4:
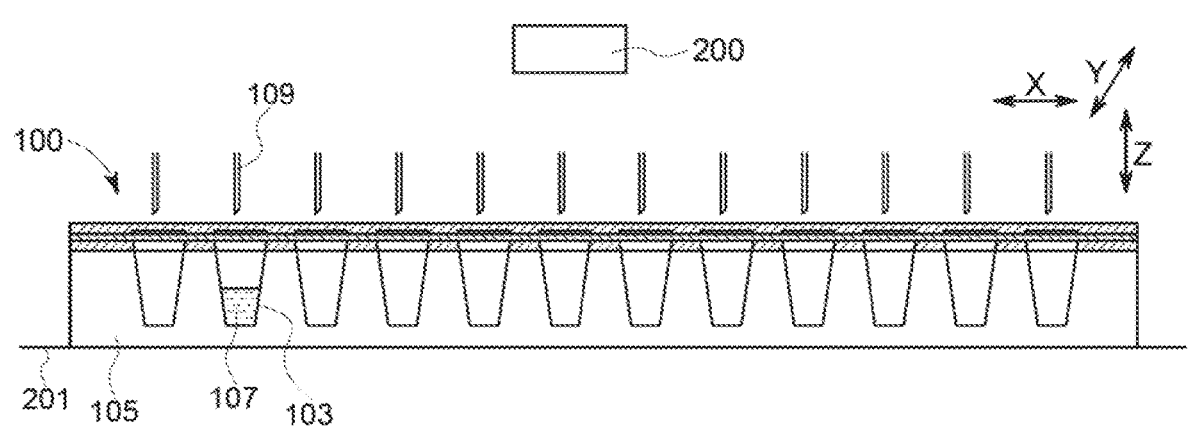
FIG. 4 shows a sectional view of a septum according to second embodiment of the invention ready for use and covering a microplate.

FIG. 4 shows a septum 100 applied to all wells of a multiwell microplate 105, in this case the twelve wells 107 of a twelve by nine (ninety six) well microplate. In practice the release film 142 (FIGS. 5 and 6) is removed and the adhesive layer 132 (FIGS. 5 and 6) is aligned with the microplate 105 so that areas with no adhesive fall over the mouths of the wells 107, thereby providing a septum for each well 107 similar to the arrangement shown in FIGS. 2 and 3. In use, the plate 105 is placed on a working table 201 of an autosampler 200, which is a device comprising plural arrayed needles 109 that are controlled by a mechanism (not shown) to move at least up and down (Z) as well as side to side (X), and often in a direction perpendicular to X and Z (Y), i.e. into and out of the paper as illustrated thus providing two, or three axis movement of the needles 109, in a two dimensional array. The autosampler needles 109 are driven collectively in use to penetrate the septum 100 in the Z direction, and to collect at least some of the contents 103 of the respective wells 107, or alternatively to deposit material into the wells.

Figures 5, 6:
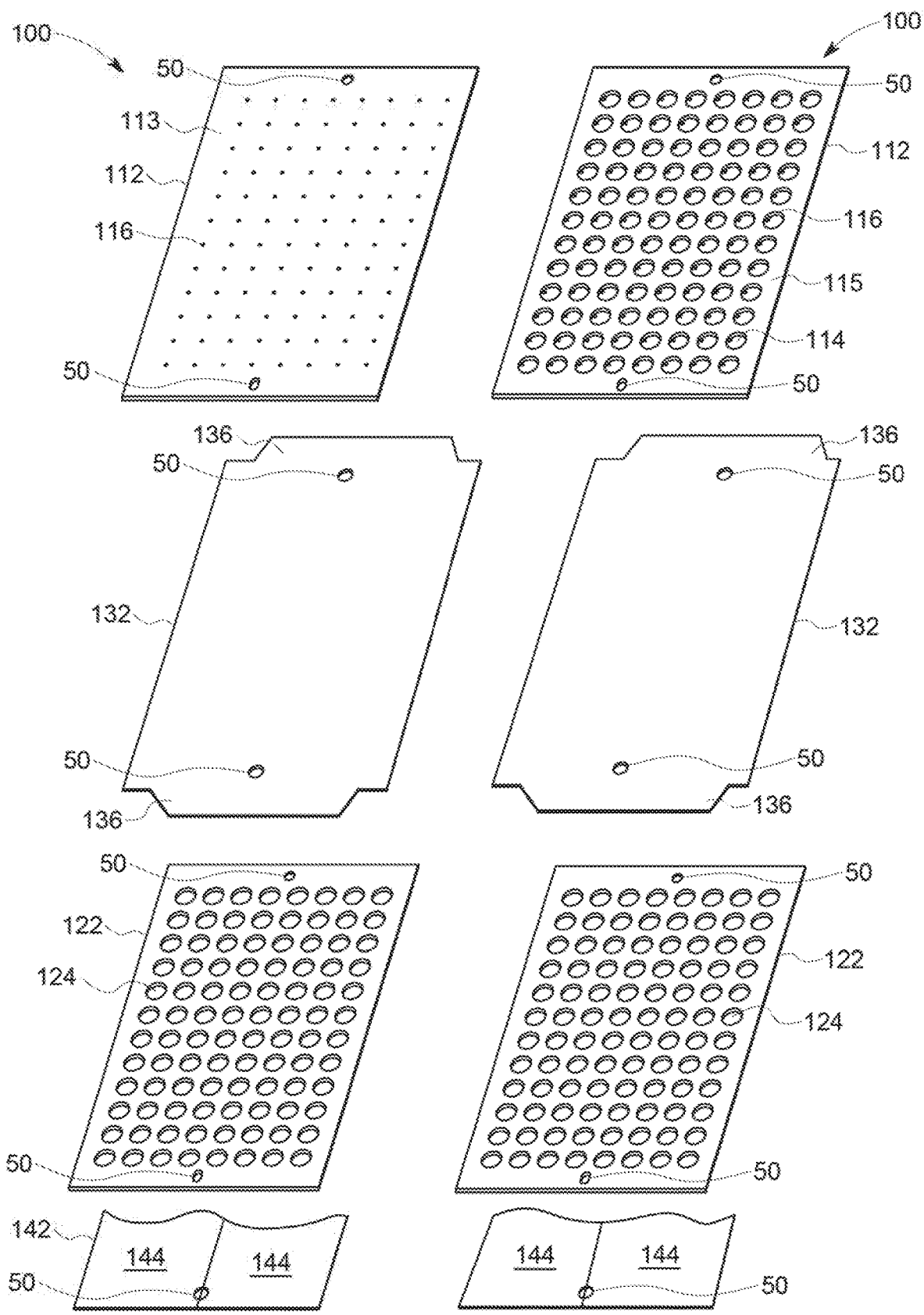
FIGS. 5 & 6 show exploded views of the septum illustrated in FIG. 4

FIGS. 5 and 6 show the construction of the septum 100 in more detail. The construction of septum 100 is similar to the construction described in relation to FIGS. 1,2 and 3 with similar components having similar reference numerals, but additionally preceded by the numeral '1' in FIGS. 5 & 6.

FIG. 5 shows the top surface 113 of a TPE layer 112, having vent apertures 116. That layer 112 is thermo-bonded to a PP layer 132, which in turn is adhered to an adhesive layer 122 and a release film 142 which is split into two halves 144 for ease of removal. Each layer is aligned using common alignment holes 50, leaving just two wings 136 exposed outside the layered components which are used to connect to the microplate 105 shown in FIG. 4.

FIG. 6 shows the underside of each component and notably the plural recesses 114 in the under face 115 of the TPE layer each of which generally coincides with an adhesive free mouth area 124.

Two embodiments only have been described and illustrated, however it will be readily apparent to the skilled addressee that modifications, additions and omissions to the above are possible without departing from the invention as claimed herein, the following being non-exhaustive examples of such modifications, additions or omissions:

1) For a clearer visualization of the layers, the drawings illustrate layers which are not to scale. In practice, the TPE layer 12/112 is preferably around 0.8 to 1.2 mm thick in total but only around half that thickness at the recess 14/114 where needle penetration is intended and where the aperture 16, having a diameter of 0.3 mm, is located. The PP layer 32/132 is preferably about 10 to 20 μm thick and the adhesive layer 22/122 is preferably about 150-200 μm plus the thickness of the release film. Thus, in comparison to the wells shown which can be 8 or more millimetres deep, the septum is shown somewhat oversize. However, any practicable thickness of layers will suffice.

2) Particular materials have been described to provide one way to put the invention into effect. However, it will be apparent that other materials would be practicable variants. For example, the TPE layer 12/112 described could alternatively be formed from other resilient thermoplastic elastomers of sufficient resilience and toughness to completely or substantially 'self close' any needle puncture i.e. the ability to be stretched to moderate elongations and, upon the removal of stress, return substantially to its original shape. Another advantage of TPE is the absence of significant creep, which means that the septum will hold it shape over time. TPE can be moulded as a melt, in a similar way to conventional thermoplastics, thereby reducing manufacturing costs. Other alternative TPE materials could be used, for example: thermoplastic olefins (TPE-o); thermoplastic polyurethanes (TPU); thermoplastic copolyesters; thermoplastic polyamides.

3) Whilst the septa 10 and 100 can be used in a wide variety of applications, of particular applicability is their use in the preparation and storage of samples intended to be analysed by particularly sensitive instruments such as high resolution microscopes, and surface plasmon resonance (SPR) instruments where even small amounts of evaporation can drastically alter measurement results. SPR instruments monitor molecular interactions in real time, using a detection principle that is sensitive to changes in refractive index within about 150 nm from the sensor surface. To study the interaction between two binding partners, one partner is attached to the surface and the other is passed over the surface in a continuous flow of sample solution including material collected from one or more wells 7/107. The SPR response is directly proportional to the change in mass concentration close to the surface. Therefore, evaporation in said wells will directly affect reading provided by the SPR instrument. Such instruments often use an automated multiwell plate handling and sample collection system (often called an autosampler and described above in relation to FIG. 4), and so the septa described herein are ideal for such use. Whilst the septa 10 and 100 are intend to cover multiwell plates, such plates typically having 96, 384 or even 1536 wells formed in a two dimensional array, it will be apparent that they can be applied to single sample wells also, for example employing manually operable sample collection needles. Whilst it is preferred that the septa 10 and 100 are to be fitted to respective wells by a user, it may be that they are supplied already adhered to wells, in which case the release films 14/142 need not be used. Indeed, the septa may even omit the adhesive layer, but rather having the layer 32/132 thermally bonded directly around a respective well or wells, such that the septa comprises just layers 12/112 and 32/132. Experimentation using septa of the design described above showed evaporation after an initial puncture i.e. as shown in FIG. 3, of less than 0.4% for well filled with 50 μl of water, thereby demonstrating the effectiveness of the layered construction described above.

We claim:

1. A self-adhesive layered septum for a multi-well plate comprising:
   a first outer layer comprising a plurality of first recesses corresponding to mouth openings of wells of the multi-well plate to which the septum is attachable, wherein the first outer layer comprises a resilient copolymer that at least partially closes an aperture formed when a needle is inserted through the first outer layer and then withdrawn; wherein each of the plurality of first recesses in the first outer layer comprises a vent to connect an inner surface of the first outer layer to an outer surface of the first outer layer; and
   an adhesive second layer comprising a plurality of second recesses forming adhesive-free regions corresponding to the mouth openings of the wells in the multi-well plate; and
   a third intermediate layer between the first outer layer and the adhesive second layer, said third intermediate layer forming a continuous film between the plurality of first recesses and the plurality of second recesses prior to any insertion of a needle through the septum.

2. The septum according to claim 1, wherein the resilient copolymer is a thermoplastic elastomer (TPE).

3. The septum according to claim 1, wherein the resilient copolymer is a styrenic block copolymer.

4. The septum according to claim 3, wherein the styrenic block copolymer is a styrene ethylene butylene styrene (SEBS) copolymer.

5. The septum according to claim 1, wherein the third intermediate layer is thermally bonded to the first outer layer.

6. The septum according to claim 1, wherein the third intermediate layer is an axially or biaxially oriented polypropylene film.

7. The septum according to claim 1, further comprising a release layer attached to the second adhesive layer.

8. A self-adhesive layered septum for a multi-well plate comprising:
   a first outer layer comprising a plurality of first recesses corresponding to mouth openings of wells of the multi-well plate to which the septum is attachable, wherein the first outer layer comprises a thermoplastic elastomer copolymer layer that at least partially closes an aperture formed when a needle is inserted through the first outer layer and then withdrawn, wherein each of the first recesses in the first outer layer comprises a vent to connect an inner surface of the first outer layer and an outer surface of the first outer layer; and
   an adhesive second layer comprising a plurality of second recesses forming adhesive-free regions corresponding to the mouth openings of the wells in the multi-well plate; and
   a third intermediate layer between the first outer layer and the adhesive second layer, said third intermediate comprises a polypropylene and forming a continuous film between the plurality of first recesses and the plurality of second recesses prior to any insertion of a needle through the septum.

9. The septum according to claim 8, wherein the thermoplastic elastomer copolymer is a styrenic block copolymer.

10. The septum according to claim 9, wherein the styrenic block copolymer is a styrene ethylene butylene styrene (SEBS) copolymer.

11. The septum according to claim 8, wherein the third intermediate layer is thermally bonded to the first outer layer.

12. The septum according to claim 8, wherein the polypropylene is an axially or biaxially oriented polypropylene film.

13. The septum according to claim 8, further comprising a release layer attached to the second adhesive layer.

* * * * *